United States Patent
Qin et al.

(10) Patent No.: US 11,185,796 B1
(45) Date of Patent: Nov. 30, 2021

(54) FAST AND HIGH-CAPACITY INTELLIGENT CELLULOSE-BASED OIL-ABSORBING MATERIAL AND PREPARATION METHOD AND USE THEREOF

(71) Applicant: GUANGXI UNIVERSITY, Guangxi (CN)

(72) Inventors: Chengrong Qin, Guangxi (CN); Hui He, Guangxi (CN); Lei Wang, Guangxi (CN); Hongxiang Zhu, Guangxi (CN); Chao Zhao, Guangxi (CN); Rimei Chen, Guangxi (CN); Zongyan Quan, Guangxi (CN); Zhiping Chen, Guangxi (CN)

(73) Assignee: GUANGXI UNIVERSITY, Guangxi (CN)

( * ) Notice: Subject to any disclaimer, the term of this patent is extended or adjusted under 35 U.S.C. 154(b) by 0 days.

(21) Appl. No.: 17/076,823

(22) Filed: Oct. 22, 2020

(30) Foreign Application Priority Data

Aug. 26, 2020 (CN) .......................... 202010868176.4

(51) Int. Cl.
| | | |
|---|---|---|
| *B01D 17/02* | (2006.01) | |
| *B01J 20/28* | (2006.01) | |
| *B01J 20/30* | (2006.01) | |
| *B01J 20/32* | (2006.01) | |
| *C02F 1/28* | (2006.01) | |
| *C02F 101/32* | (2006.01) | |

(52) U.S. Cl.
CPC ..... *B01D 17/0202* (2013.01); *B01J 20/28011* (2013.01); *B01J 20/28035* (2013.01); *B01J 20/3085* (2013.01); *B01J 20/3204* (2013.01); *B01J 20/3225* (2013.01); *B01J 20/3274* (2013.01); *B01J 20/3293* (2013.01); *B01J 20/3295* (2013.01); *C02F 1/288* (2013.01); *C02F 2101/32* (2013.01)

(58) Field of Classification Search
CPC ................ B01J 20/3204; B01J 20/3274; B01J 20/3085; B01J 20/3295; B01J 20/28035; B01J 20/28011; B01J 20/3293; B01J 20/321; B01J 20/3225; B01J 20/28032; C02F 1/28; C02F 1/288; C02F 2101/32; B01D 15/00; B01D 17/0202
See application file for complete search history.

(56) References Cited

U.S. PATENT DOCUMENTS

| | | | | |
|---|---|---|---|---|
| 10,487,217 | B2 * | 11/2019 | Lynn | ..................... C09D 179/02 |
| 2010/0282422 | A1 * | 11/2010 | Miyawaki | ............... C08B 15/02 162/76 |
| 2018/0086851 | A1 * | 3/2018 | Hsiao | ....................... B01J 20/24 |

OTHER PUBLICATIONS

Zeng et al. Novel pH-Responsive Smart Fabric: From Switchable Wettability to Controllable On-Demand Oil/Water Separation. ACS Sustainable Chern. Eng. 2019, 7, 368-376. (Year: 2019).*
Tarres et al. Magnetic bionanocomposites from cellulose nanofibers: Fast, simple and effective production method. International Journal of Biological Macromolecules 99 (2017) 29-36. (Year: 2017).*
Li et al. Smart Fiber Membrane for pH-lnduced Oil/Water Separation. ACS Appl. Mater. Interfaces 2015, 7, 19643-19650. (Year: 2015).*
Nasseri et al. Cellulose nanocrystals in smart and stimuli-responsive materials: a review. Materials Today Advances 5 (2020) 100055. (Year: 2020).*
Amiralian et al. Magnetic nanocellulose: A potential material for removal of dye from water. Journal of Hazardous Materials 394 (2020) 122571. (Year: 2020).*

* cited by examiner

*Primary Examiner* — Benjamin L Lebron
(74) *Attorney, Agent, or Firm* — JCIP Global Inc.

(57) ABSTRACT

The present disclosure provides a fast and high-capacity intelligent cellulose-based oil-absorbing material and a preparation method and use thereof. The material includes an intelligent response layer and an adsorption layer. The intelligent response layer is a pH-responsive nanofiber layer with an adjustable pH response performance and is obtained by grafting hyperbranched polycarboxylic acid-modified polyethyleneimine on to carboxylated cellulose nanofibers. The hyperbranched polycarboxylic acid is prepared by melting and polycondensing at a high temperature, using trimethylolpropane as a core, citric acid as a reactive monomer, and p-toluenesulfonic acid as a catalyst. The adsorption layer is prepared by coating ferroferric oxide with the carboxylated cellulose nanofibers to prepare magnetic carboxylated cellulose nanofibers, and then modifying the magnetic carboxylated cellulose nanofibers with hexadecylamine.

6 Claims, No Drawings

FAST AND HIGH-CAPACITY INTELLIGENT CELLULOSE-BASED OIL-ABSORBING MATERIAL AND PREPARATION METHOD AND USE THEREOF

CROSS-REFERENCE TO RELATED APPLICATION

This application claims the priority benefit of China application serial no. 202010868176.4, filed on Aug. 26, 2020. The entirety of the above-mentioned patent application is hereby incorporated by reference herein and made a part of this specification.

TECHNICAL FIELD

The present disclosure belongs to the technical field of oil-absorbing material and environmental protection, and more particularly, to a fast and high-capacity intelligent cellulose-based oil-absorbing material and a preparation method and use thereof.

BACKGROUND

In recent years, with the improvement of people's living standards, the demand for petroleum and petroleum products has increased. During the extraction, processing, storage, transportation and use of petroleum, leakage will occur due to various accidents, causing serious pollution of the water environment of rivers, lakes, and oceans, causing immeasurable ecological disasters, and even threatening the development of inshore fishery, and aquaculture industry and tourism. How to carry out oil-water separation quickly, efficiently and cheaply is a problem of widespread concern in this field. The use of an oil-absorbing material for oil-water separation treatment is one of the most effective methods to cope with oil leakage currently.

Oil-absorbing materials can generally be divided into inorganic materials, organic synthetic materials and natural polymer materials. Inorganic materials, such as activated carbon, expanded graphite, silica, organically modified clay, etc., have low oil absorption and are difficult to recycle. Organic synthetic materials, such as polypropylene, polyurethane foam, acrylics and olefin oil-absorbing resins, etc., all have good lipophilicity and oil absorption efficiency, but their applications are restricted by their poor regeneration performance and recalcitrance. Waste polymer materials, such as waste corrugated paper, waste sweaters, waste cotton clothes and other porous materials, rely on capillary action to adsorb oil on the surface of the material, but these materials have a slow oil-absorption speed, a low oil absorption rate and a poor oil-water selectivity, and it takes a lot of manpower and material resources, which limits their application. At present, developing a multifunctional oil-absorbing material with high oil absorption rate and fast oil-absorption speed which is renewable and convenient to recycling is an urgent problem to be solved.

SUMMARY

Aiming at the above-mentioned shortcomings of the prior art, the present disclosure provides a fast and high-capacity intelligent cellulose-based oil-absorbing material which is a nanofiber-based aerogel oil-absorbing material composed of an intelligent response layer and an adsorption layer. It has rapid adsorptivity and high adsorption capacity for various oil products. It can not only adsorb free oil products, but also separate emulsified oil. After the emulsified oil is demulsified, the oil can be adsorbed, and the adsorption capacity can be greater than 112 g/g within 2 minutes. It has high elasticity-compression performance as well. After adsorption, it can be compressed and regenerated with a regeneration rate higher than 90%, and it can be recycled through magnetic separation.

The above technical problem is solved by the present disclosure by implementing the following technical solutions.

A fast and high-capacity intelligent cellulose-based oil-absorbing material includes an intelligent response layer and an adsorption layer. The intelligent response layer is a pH-responsive nanofiber layer with an adjustable pH response performance and is obtained by grafting hyperbranched polycarboxylic acid-modified polyethyleneimine on to carboxylated cellulose nanofibers. A molar ratio of amino groups to carboxyl groups of the hyperbranched polycarboxylic acid-modified polyethyleneimine is 1:(0.1-0.5) or 1:(1.5-2.0). The hyperbranched polycarboxylic acid is prepared by melting and polycondensing at a high temperature, using trimethylolpropane as a core, citric acid as a reactive monomer, and p-toluenesulfonic acid as a catalyst. The adsorption layer is prepared by coating ferroferric oxide with the carboxylated cellulose nanofibers to prepare magnetic carboxylated cellulose nanofibers, and then modifying the magnetic carboxylated cellulose nanofibers with hexadecylamine. The intelligent response layer and the adsorption layer form a double-layer structure by layer by layer vacuum filtration, after the double-layer structure is formed, a cross-linking agent epichlorohydrin is sprayed on a surface of the double-layer structure by a spray way under a low-vacuum condition, and then freeze-dried to form an aerogel to obtain the fast and high-capacity intelligent cellulose-based oil-absorbing material.

The fast and high-capacity intelligent cellulose-based oil-absorbing material is prepared according to a method including the following steps:

S1, preparation of the carboxylated cellulose nanofibers: selectively oxidizing hydroxyl groups on $C_2$ and $C_3$ of a cellulose structural unit of an paper pulp to aldehyde groups using sodium periodate to prepare dialdehyde cellulose; then oxidizing the aldehyde groups on $C_2$ and $C_3$ and hydroxyl groups on $C_6$ of the cellulose structural unit of the dialdehyde cellulose to carboxyl groups using a TEMPO reagent to prepare the carboxylated cellulose nanofibers;

S2, preparation of the adsorption layer:

1) preparation of a modified magnetic fluid $Fe_3O_4$: making $FeCl_3.6H_2O$ and $FeSO_4.7H_2O$ to undergo a chemical co-precipitation reaction under alkaline conditions to obtain $Fe_3O_4$ particles, and then using triethylenetetramine as a complexing agent to modify the $Fe_3O_4$ particles to obtain the modified magnetic fluid $Fe_3O_4$;

2) preparation of the magnetic carboxylated cellulose nanofibers: dispersing the carboxylated cellulose nanofibers prepared in the step S1 in water to prepare a carboxylated cellulose nanofiber dispersion, after adding the modified magnetic fluid $Fe_3O_4$ and mixing well, adding 1-[3-(Dimethylamino)propyl]-3-ethylcarbodiimide hydrochloride and N-hydroxysuccinimide into the mixture in turn, then reacting at room temperature for 12 to 18 hours, washing and drying to obtain the magnetic carboxylated cellulose nanofibers with the carboxylated cellulose nanofibers coating $Fe_3O_4$; a mass fraction of the carboxylated cellulose nanofiber dispersion is 2% to 5%, a volume/mass/mass/mass ratio of the carboxylated cellulose nanofiber dispersion, the modified magnetic fluid $Fe_3O_4$, 1-[3-(Dimethylamino)propyl]-3-ethylcarbodiimide hydrochloride and N-hydroxysuccinimide is 150 mL:(0.5-1.0 g):500 mg:500 mg;

3) preparation of the adsorption layer: dissolving hexadecylamine in ethanol, dispersing the magnetic carboxylated cellulose nanofibers in water, mixing the two, after ultrasonicating for 25 to 35 minutes, adding 1-[3-(Dimethylamino)propyl]-3-ethylcarbodiimide hydrochloride and N-hydroxysuccinimide into the mixture in turn, then reacting at room temperature for 6 to 24 hours, washing, freeze drying to prepare the adsorption layer with magnetic responsiveness and a superhydrophobic-superlipophilic performance; and a mass ratio of hexadecylamine, the magnetic carboxylated cellulose nanofibers, 1-[3-(Dimethylamino) propyl]-3-ethylcarbodiimide hydrochloride and N-hydroxysuccinimide is (5-10):(3-6):0.25:0.25;

S3, preparation of the intelligent response layer:

(1) preparation of the hyperbranched polycarboxylic acid: mixing trimethylolpropane, citric acid and p-toluenesulfonic acid and reacting at 135° C. to 150° C. under stirring conditions for 1.5 to 2.5 hours to obtain the hyperbranched polycarboxylic acid;

(2) dissolving polyethyleneimine and the hyperbranched polycarboxylic acid in a sodium hydroxide aqueous solution at a mass ratio of 1:(0.2-0.6) or 1:(1.6-2.2), then adding sodium hypophosphite into the mixture at a mass ratio of the polyethyleneimine to sodium hypophosphite of 1:(0.8-1.2), then after a reaction of stirring at 100° C. to 105° C. is completed, cooling the mixture to room temperature to obtain the hyperbranched polycarboxylic acid-modified polyethyleneimine; regulating a mass ratio of the polyethyleneimine to the hyperbranched polycarboxylic acid to 1:(0.2-0.6), so that a molar ratio of amino groups to carboxyl groups on the hyperbranched polycarboxylic acid-modified polyethyleneimine correspondingly obtained is 1:(0.1-0.5); regulating the mass ratio of the polyethyleneimine to the hyperbranched polycarboxylic acid to 1:(1.6-2.2), so that the molar ratio of the amino groups to the carboxyl groups on the hyperbranched polycarboxylic acid-modified polyethyleneimine correspondingly obtained is 1:(1.5-2.0);

(3) after mixing well the carboxylated cellulose nanofibers prepared in the step S1 and the hyperbranched polycarboxylic acid-modified polyethyleneimine at a mass ratio of 1:(2-20), adding N-(3-dimethylaminopropyl)-N'-ethylcarbodiimide hydrochloride and N-hydroxysuccinimide into the mixture in turn, then reacting at room temperature for 8 to 24 hours, then rinsing with an HCl solution, centrifuging and freeze drying to obtain the intelligent response layer; and a mass ratio of the carboxylated cellulose nanofibers, N-(3-dimethylaminopropyl)-N'-ethylcarbodiimide hydrochloride and N-hydroxysuccinimide is 1:(0.25-0.5):(0.25-0.5); and S4, preparation of the fast and high-capacity intelligent cellulose-based oil-absorbing material:

suction filtering the adsorption layer, then suction filtering the intelligent response layer to form the double-layer structure, a mass ratio of the adsorption layer to the intelligent response layer being (10-50):1; after forming the double-layer structure, controlling a vacuum degree during suction filtration to 0.01 to 0.04 MPa, spraying the cross-linking agent epichlorohydrin on a surface of the double-layer structure by a spray way, relying on low vacuum to penetrate the cross-linking agent inside the material, soaking in water at room temperature for 0.5 to 2.0 hours, and then freeze-dried to form an aerogel to obtain the fast and high-capacity intelligent cellulose-based oil-absorbing material; and a mass of the added epichlorohydrin is 1% to 10% of a total mass of the adsorption layer and the intelligent response layer.

Further, a specific operation of the preparation of the modified magnetic fluid $Fe_3O_4$ in the step 1) is as follows: adding deionized water into a mixture of $FeCl_3.6H_2O$ and $FeSO_4.7H_2O$, stirring in a 70° C. to 80° C. water bath until dissolved, after bubbling nitrogen for 5 to 15 minutes, quickly adding an ammonia water with a mass fraction of 30% to 35%, continuing stirring under nitrogen protection for 1 to 3 hours to obtain the $Fe_3O_4$ particles; adding the $Fe_3O_4$ particles into a triethylenetetramine aqueous solution with a mass fraction of 2% to 5%, stirring for 0.5 to 1.0 hours, heating to 90° C. to 95° C., curing with heat preservation for 20 to 30 minutes to obtain the modified magnetic fluid $Fe_3O_4$; and a mass/mass/volume/volume/volume ratio of $FeCl_3.6H_2O$, $FeSO_4.7H_2O$, deionized water, the ammonia water with the mass fraction of 30% to 35% and the triethylenetetramine aqueous solution with the mass fraction of 2% to 5% is 18 g:(9-10 g):20 mL:30 mL:30 mL.

Preferably, the paper pulp is one of or a mixture of two or more of a bleached bagasse pulp fiber, a bleached eucalyptus pulp fiber, a bleached bamboo pulp fiber, a bleached masson pine pulp fiber and a bleached wheat straw pulp fiber.

In the fast and high-capacity intelligent cellulose-based oil-absorbing material according to the present disclosure, the intelligent response layer thereof has an intelligent response performance of superhydrophilic-superoleophobic or superhydrophobic-superlipophilic to pH; the intelligent response layer has a water contact angle <10° and an oil contact angle >150° when having superhydrophilic-superoleophobic property to pH, and has a water contact angle >150° and an oil contact angle <10° when having superhydrophobic-superlipophilic property to pH. By regulating the molar ratio of the amino groups to the carboxyl groups on the hyperbranched polycarboxylic acid-modified polyethyleneimine to 1:(0.1-0.5) or 1:(1.5-2.0), a molar ratio of amino groups to carboxyl groups on a fiber of the intelligent response layer is regulated to 1:(0.1-0.5) or 1:(1.5-2.0). When the molar ratio of the amino groups to the carboxyl groups is 1:(0.1-0.5) and pH of the intelligent response layer is acidic, the intelligent response layer has superhydrophilic-superoleophobic property, and when the pH of the intelligent response layer changes from acidic to alkaline, the intelligent response layer changes from superhydrophilic-superoleophobic property to superhydrophobic-superlipophilic property. When the molar ratio of the amino groups to the carboxyl groups is 1:(1.5-2.0) and the pH of the intelligent response layer is acidic, the intelligent response layer has superhydrophobic-superlipophilic property, and when the pH of the intelligent response layer changes from acidic to alkaline, the intelligent response layer changes from superhydrophobic-superlipophilic property to superhydrophilic-superoleophobic property. The adsorption layer has superhydrophobic-superlipophilic performance, with a water contact angle >150° and an oil contact angle <10°.

The fast and high-capacity intelligent cellulose-based oil-absorbing material according to the present disclosure can be applied to oil-water separation. The material has fast adsorptivity and high absorption capacity for a variety of oil products. It can not only adsorb free oil products, but also separate emulsified oil. After emulsified oil is demulsified, the oil can be adsorbed. It can achieve an adsorption capacity greater than 112 g/g within 2 minutes, and it has high elastic-compression performance. After adsorption, it can be regenerated by compression, with a regeneration rate higher than 90%, and meanwhile it can be recycled by magnetic separation.

Compared with the prior art, the present disclosure has the following beneficial effects:

(1) The fast and high-capacity intelligent cellulose-based oil-absorbing material prepared by the present disclosure having the double-layer structure consisting of the intelligent response layer and the adsorption layer has fast adsorptivity and high absorption capacity for a variety of oil products. It can not only adsorb free oil products, but also separate emulsified oil. After emulsified oil is demulsified, the oil can be adsorbed, and the adsorption capacity can be greater than 112 g/g within 2 minutes. It has high elasticity-compression performance as well. After adsorption, it can be compressed and regenerated with a regeneration rate higher than 90%, and it can be recycled through magnetic separation.

(2) In the material prepared by the present disclosure, the adsorption layer thereof the is a chemically grafted hydrophobic lipophilic reagent (hexadecylamine), a grafting rate of the reagent on the fiber is higher than 115%, achieving superhydrophobic and superlipophilic performance of the adsorption layer, with a water contact angle >150° and an oil contact angle <10°, so the material has very high adsorption capacity and quick adsorptivity to a variety of oil products, the adsorption capacity thereof is greater than 112 g/g within 2 minutes, and the oil absorption rate of the material to oil products such as crude oil, diesel, gasoline, engine oil and peanut oil is greater than 112 g/g.

(3) In the material prepared by the present disclosure, the intelligent response layer thereof has the intelligent response performance of superhydrophilic-superoleophobic (water contact angle <10°, oil contact angle >150°) and superhydrophobic-superlipophilic (water contact angle >150°, oil contact angle <10°) to pH, which is used to demulsify emulsified oil, the superhydrophilic-superoleophobic property of the material realizes the demulsification of O/W type emulsified oil, and superhydrophobic-superlipophilic property realizes the demulsification of W/O type emulsified oil, overcoming the problem that the existing cellulose-based aerogel material is difficult to achieve the separation of emulsified oil.

(4) In the material prepared by the present disclosure, the intelligent response layer of has the intelligent response performance of superhydrophilic-superoleophobic (water contact angle <10°, oil contact angle >150°) and superhydrophobic-superlipophilic (water contact angle >150°, oil contact angle <10°) to pH. By cleverly conceiving and designing the combination of two groups with opposite pH response properties (amino group and carboxyl group), and thereby designing the required response performance according to application requirements, surface properties of the intelligent response layer can switch between superhydrophilic-superoleophobic and superhydrophobic-superlipophilic. It can realize superhydrophilic-superoleophobic under acidic conditions and superhydrophobic-superlipophilic under alkaline conditions, and can also realize superhydrophobic-superlipophilic under acidic conditions and superhydrophilic-superoleophobic under alkaline conditions. It provides convenience for the application of materials in the field of emulsified oil separation.

(5) In the oil-absorbing material prepared by the present disclosure having the double-layer structure consisting of the intelligent response layer and adsorption layer, the connection between the intelligent response layer and the adsorption layer is a chemical cross-linking structure. Under low vacuum conditions, the cross-linking agent epichlorohydrin is diffused from the intelligent response layer to the adsorption layer, and then the epichlorohydrin reacts with the hydroxyl groups of the cellulose to form a cross-linked structure, maintaining its high elasticity-compression performance during use.

(6) The material prepared by the present disclosure can be recovered by magnetic separation, and its magnetic core (ferroferric oxide) is chemically embedded inside the adsorption layer, that is, inside the material, so that the magnetic core is not easy to fall off during the application process.

DETAILED DESCRIPTION

Embodiment 1

S1. Preparation of carboxylated cellulose nanofibers: 20 g of absolute dry bleached bagasse pulp fiber was taken into a conical flask, 1000 mL of a potassium hydrogen phthalate buffer (0.05 M, pH=3) was added, 10.0 g of sodium periodate was then added, after the conical flask was wrapped with tinfoil, stirring was conducted at 30° C. for 4.5 hours, finally 50 mL of ethylene glycol was added to terminate the reaction, and the product was suction filtered, washed and dried to obtain dialdehyde cellulose. 10 g of the dialdehyde cellulose was added with 900 mL of a sodium phosphate buffer (0.05M, pH=6.8), the suspension was stirred in a sealed flask at 500 rmp and 55° C., and then 0.15 g of TEMPO was added, then 5.915 mL of 1.69 M sodium hypochlorite solution was added, finally 10.6535 g of sodium chlorite was added, oxidation was conducted for 17 hours, and 25 mL of ethanol was added to quench, and washing and drying were conducted to obtain the carboxylated cellulose nanofibers.

S2. Preparation of an adsorption layer:

1) preparation of a modified magnetic fluid $Fe_3O_4$: 90 g $FeCl_3.6H_2O$ and 45 g $FeSO_4.7H_2O$ were weighed into a 500 mL 3-neck flask, 100 mL deionized water was added, stirring was conducted in a 70° C. water bath until dissolved, after nitrogen was bubbled for 15 minutes, 150 mL of ammonia water with a mass fraction of 30% was quickly added, stirring was continued for 3 hours under the protection of nitrogen, a magnetic was used for separation, deionized water was used to wash until the supernatant is neutral to obtain the $Fe_3O_4$ particles; the $Fe_3O_4$ particles were added to 150 mL of triethylenetetramine aqueous solution with a mass fraction of 2%, stirring was conducted for 0.5 hour, temperature was increased to 95° C., curing was conducted with heat preservation for 20 minutes, the solid was separated with a magnet, deionized water was used to wash until the supernatant is neutral to obtain the modified magnetic fluid $Fe_3O_4$.

2) preparation of magnetic carboxylated cellulose nanofibers: the carboxylated cellulose nanofibers prepared in the step S1 were dispersed in water to prepare 150 mL of dispersion with a mass fraction of 2%, 0.5 g of modified magnetic fluid $Fe_3O_4$ was added, after mixed well, 500 mg of 1-[3-(Dimethylamino)propyl]-3-ethylcarbodiimide hydrochloride and 500 mg of N-hydroxysuccinimide were added in turn into the mixture, then reaction was conducted at room temperature for 12 hours, and washing and drying were conducted to obtain the magnetic carboxylated cellulose nanofibers with the carboxylated cellulose nanofibers coating $Fe_3O_4$.

3) preparation of an adsorption layer: 5 g of hexadecylamine was dissolved into 50 mL of ethanol, 3 g of the magnetic carboxylated cellulose nanofibers were dispersed into 50 mL of water, the two were mixed, after 25 minutes of ultrasonication, 250 mg of 1-[3-(Dimethylamino)propyl]-3-ethylcarbodiimide hydrochloride and 250 mg of N-hydroxysuccinimide were added in turn in to the mixture, then reaction was conducted at room temperature for 6 hours, after reaction, washing was conducted with ethanol water with a volume fraction of 70%, and freeze drying was conducted to prepare the adsorption layer with magnetic responsiveness and a superhydrophobic-superlipophilic performance.

S3. Preparation of an intelligent response layer:

(1) preparation of hyperbranched polycarboxylic acid: 0.1 mol of trimethylolpropane (13.4 g), 0.3 mol of citric acid (57.6 g) and p-toluenesulfonic acid (0.71 g) were placed in a 250 mL 3-neck flask first; and then the 3-neck flask was placed in an oil bath and was connected with a the mechanical stirring device. The middle port was inserted with a stirrer with a rotation speed of 250 r/min, the left port was plugged with a rubber plug, the right port was connected to a condensation bend, and the top of the flask was covered with a rag to make it easier for water vapor to flow out of the bend during the reaction. The oil bath was set to 140° C., and reaction time was 2 hours. At the end of the reaction, the product hyperbranched polycarboxylic acid was quickly poured from the side port with less water vapor into a small beaker, and the beaker was sealed with plastic wrap, cooled at room temperature, and finally was stored in a dryer.

(2) Polyethyleneimine and hyperbranched polycarboxylic acid were dissolved in 2 wt % sodium hydroxide aqueous solution at a mass ratio of 1:0.2, then sodium hypophosphite was added to the mixture at a mass ratio of the polyethyleneimine to sodium hypophosphite of 1:0.8, then after the reaction was finished by stirring at 100° C., the mixture was cooled to room temperature to obtain the hyperbranched polycarboxylic acid-modified polyethyleneimine; and a mass ratio of the polyethyleneimine to the hyperbranched polycarboxylic acid was regulated to 1:0.2, so that the molar ratio of the amino groups to the carboxyl groups on the hyperbranched polycarboxylic acid-modified polyethyleneimine correspondingly obtained was 1:0.1.

(3) After the carboxylated cellulose nanofibers prepared in the step S1 and the hyperbranched polycarboxylic acid-modified polyethyleneimine were mixed well at a mass ratio of 1:2, N-(3-dimethylaminopropyl)-N'-ethylcarbodiimide hydrochloride (mass ratio of the carboxylated cellulose nanofibers to N-(3-dimethylaminopropyl)-N'-ethylcarbodiimide hydrochloride was 1:0.25) and N-hydroxysuccinimide (mass ratio of the carboxylated cellulose nanofibers to N-hydroxysuccinimide was 1:0.25) were added into the mixture in turn, then reaction was continued for 8 hours at room temperature, then 0.1 mol/L HCl solution was used to rinse, finally centrifugation was conducted at a speed of 10000 r/min to neutral, and freeze drying was conducted to obtain the intelligent response layer.

S4. Preparation of a fast and high-capacity intelligent cellulose-based oil-absorbing material:

The intelligent response layer and the adsorption layer formed a double-layer structure by layer by layer vacuum filtration: the adsorption layer was suction filtered, then the intelligent response layer was suction filtered to form the double-layer structure, and a mass ratio of the adsorption layer to the intelligent response layer was 10:1; after the double-layer structure was formed, a vacuum degree during suction filtration was controlled to 0.01 MPa, a cross-linking agent epichlorohydrin (a mass of the added epichlorohydrin is 1% of a total mass of the adsorption layer and the intelligent response layer) was sprayed on a surface of the double-layer structure by a spray way, the cross-linking agent was penetrated inside the material relying on low vacuum, soaking was conducted in water at room temperature for 0.5 hour, and then freeze drying was conducted to form an aerogel to obtain the fast and high-capacity intelligent cellulose-based oil-absorbing material.

Embodiment 2

S1. Preparation of carboxylated cellulose nanofibers: 20 g of absolute dry bleached bagasse pulp fiber was taken in to a conical flask, 1000 mL of potassium hydrogen phthalate buffer (0.05M, pH=3) was added, 12 g of sodium periodate was then added, after the conical flask was wrapped with tinfoil, stirring was conducted at 35° C. for 4 hours, finally 50 mL of ethylene glycol was added to terminate the reaction, and the product was suction filtered, washed and dried to obtain dialdehyde cellulose. 10 g of the dialdehyde cellulose was added with 900 mL of sodium phosphate buffer (0.05M, pH=6.8), the suspension was stirred in a sealed flask at 500 rmp and 60° C., and then 0.16 g of TEMPO was added, then 5.915 mL of 1.69 M sodium hypochlorite solution was added, finally 10.6535 g of sodium chlorite was added, oxidation was conducted for 16 hours, and 25 mL of ethanol was added to quench, and washing and drying were conducted to obtain the carboxylated cellulose nanofibers.

S2. Preparation of an adsorption layer:

1) Preparation of a modified magnetic fluid $Fe_3O_4$: 90 g $FeCl_3 \cdot 6H_2O$ and 48 g $FeSO_4 \cdot 7H_2O$ were weighed into a 500 mL 3-neck flask, 100 mL of deionized water was added, stirring was conducted in a 75° C. water bath until dissolved, after nitrogen was bubbled for 10 minutes, 150 mL of ammonia water with a mass fraction of 30% was quickly added, stirring was continued for 2 hours under the protection of nitrogen, a magnetic was used for separation, deionized water was used to wash until the supernatant is neutral to obtain the $Fe_3O_4$ particles; the $Fe_3O_4$ particles were added to 150 mL of triethylenetetramine aqueous solution with a mass fraction of 3%, stirring was conducted for 0.75 hour, temperature was increased to 92° C., curing was conducted with heat preservation for 25 minutes, the solid was separated with a magnet, deionized water was used to wash until the supernatant is neutral to obtain the modified magnetic fluid $Fe_3O_4$.

2) Preparation of magnetic carboxylated cellulose nanofibers: the carboxylated cellulose nanofibers prepared in the step S1 were dispersed in water to prepare 150 mL of dispersion with a mass fraction of 4%, 0.8 g of the modified magnetic fluid $Fe_3O_4$ was added, after mixed well, 500 mg of 1-[3-(Dimethylamino)propyl]-3-ethylcarbodiimide hydrochloride and 500 mg of N-hydroxysuccinimide were added into the mixture in turn, then reaction was conducted at room temperature for 15 hours, and washing and drying were conducted to obtain the magnetic carboxylated cellulose nanofibers with the carboxylated cellulose nanofibers coating $Fe_3O_4$.

3) Preparation of an adsorption layer: 7.5 g of hexadecylamine was dissolved in 50 mL of ethanol, 4.5 g of the magnetic carboxylated cellulose nanofibers were dispersed in 50 mL of water, the two were mixed, after 30 minutes of ultrasonication, 250 mg of 1-[3-(Dimethylamino)propyl]-3-ethylcarbodiimide hydrochloride and 250 mg of N-hydroxysuccinimide were added into the mixture in turn, then reaction was conducted at room temperature for 12 hours, after reaction, washing was conducted with ethanol water with a volume fraction of 70%, and freeze drying was conducted to prepare the adsorption layer with magnetic responsiveness and a superhydrophobic-superlipophilic performance.

S3. Preparation of an intelligent response layer:

(1) Preparation of hyperbranched polycarboxylic acid: 0.1 mol of trimethylolpropane (13.4 g), 0.35 mol of citric acid (67.2 g) and p-toluenesulfonic acid (0.64 g) were placed in a 250 mL 3-neck flask first; and then the 3-neck flask was placed in an oil bath and was connected with a the mechanical stirring device. The middle port was inserted with a stirrer with a rotation speed of 250 r/min, the left port was plugged with a rubber plug, the right port was connected to a condensation bend, and the top of the flask was covered with a rag to make it easier for water vapor to flow out of the bend during the reaction. The oil bath was set to 135° C., and reaction time was 1.5 hours. At the end of the reaction, the product hyperbranched polycarboxylic acid was quickly poured from the side port with less water vapor into a small beaker, and the beaker was sealed with plastic wrap, cooled at room temperature, and finally was stored in a dryer.

(2) Polyethyleneimine and hyperbranched polycarboxylic acid were dissolved in 2 wt % sodium hydroxide aqueous solution at a mass ratio of 1:0.4, then sodium hypophosphite was added to the mixture at a mass ratio of the polyethyleneimine to sodium hypophosphite of 1:1, then after the reaction was finished by stirring at 100° C., the mixture was cooled to room temperature to obtain the hyperbranched polycarboxylic acid-modified polyethyleneimine; and a mass ratio of the polyethyleneimine to the hyperbranched polycarboxylic acid was regulated to 1:0.4, so that the molar ratio of the amino groups to the carboxyl groups on the hyperbranched polycarboxylic acid-modified polyethyleneimine correspondingly obtained was 1:0.3.

(3) After the carboxylated cellulose nanofibers prepared in the step S1 and the hyperbranched polycarboxylic acid-modified polyethyleneimine were mixed well at a mass ratio of 1:10, N-(3-dimethylaminopropyl)-N'-ethylcarbodiimide hydrochloride (mass ratio of carboxylated cellulose nanofibers to N-(3-dimethylaminopropyl)-N'-ethylcarbodiimide hydrochloride was 1:0.4) and N-hydroxysuccinimide (mass ratio of carboxylated cellulose nanofibers to N-hydroxysuccinimide was 1:0.4) were added into the mixture in turn, then reaction was continued for 12 hours at room temperature, then 0.1 mol/L HCl solution was used to rinse, finally centrifugation was conducted at a speed of 10000 r/min to neutral, and freeze drying was conducted to obtain the intelligent response layer.

S4. Preparation of a fast and high-capacity intelligent cellulose-based oil-absorbing material:

The intelligent response layer and the adsorption layer formed a double-layer structure by layer by layer vacuum filtration: the adsorption layer was suction filtered, then the intelligent response layer was suction filtered to form the double-layer structure, a mass ratio of the adsorption layer to the intelligent response layer was 30:1; after the double-layer structure was formed, a vacuum degree during suction filtration was controlled to 0.03 MPa, a cross-linking agent epichlorohydrin (a mass of the added epichlorohydrin is 5% of a total mass of the adsorption layer and the intelligent response layer) was sprayed on a surface of the double-layer structure by a spray way, the cross-linking agent was penetrated inside the material relying on low vacuum, soaking was conducted in water at room temperature for 1.0 hour, and then freeze drying was conducted to form an aerogel to obtain the fast and high-capacity intelligent cellulose-based oil-absorbing material.

Embodiment 3

S1. Preparation of carboxylated cellulose nanofibers: 20 g of absolute dry bleached bagasse pulp fiber was taken into a conical flask, 1000 mL of potassium hydrogen phthalate buffer (0.05 M, pH=3) was added, 15 g of sodium periodate was then added, after the conical flask was wrapped with tinfoil, stirring was conducted at 40° C. for 3.5 hours, finally 50 mL of ethylene glycol was added to terminate the reaction, and the product was suction filtered, washed and dried to obtain dialdehyde cellulose. 10 g of the dialdehyde cellulose was added with 900 mL of sodium phosphate buffer (0.05 M, pH=6.8), the suspension was stirred in a sealed flask at 500 rmp and 65° C., and then 0.175 g of TEMPO was added, then 5.915 mL of 1.69M sodium hypochlorite solution was added, finally 10.6535 g of sodium chlorite was added, oxidation was conducted for 15 hours, and 10 mL of ethanol was added to quench, and washing and drying were conducted to obtain the carboxylated cellulose nanofibers.

S2. Preparation of an adsorption layer:

1) Preparation of a modified magnetic fluid $Fe_3O_4$: 90 g $FeCl_3 \cdot 6H_2O$ and 50 g $FeSO_4 \cdot 7H_2O$ were weighed into a 500 mL 3-neck flask, 100 mL of deionized water was added, stirring was conducted in a 80° C. water bath until dissolved, after nitrogen was bubbled for 5 minutes, 150 mL of ammonia water with a mass fraction of 30% was quickly added, stirring was continued for 1 hour under the protection of nitrogen, a magnetic was used for separation, deionized water was used to wash until the supernatant is neutral to obtain the $Fe_3O_4$ particles; the $Fe_3O_4$ particles were added to 150 mL of triethylenetetramine aqueous solution with a mass fraction of 5%, stirring was conducted for 1 hour, temperature was increased to 90° C., curing was conducted with heat preservation for 30 minutes, the solid was separated with a magnet, deionized water was used to wash until the supernatant is neutral to obtain the modified magnetic fluid $Fe_3O_4$.

2) Preparation of magnetic carboxylated cellulose nanofibers: the carboxylated cellulose nanofibers prepared in the step S1 were dispersed in water to prepare 150 mL of dispersion with a mass fraction of 4%, 1 g of modified magnetic fluid $Fe_3O_4$ was added, after mixed well, 500 mg of 1-[3-(Dimethylamino)propyl]-3-ethylcarbodiimide hydrochloride and 500 mg of N-hydroxysuccinimide were added into the mixture in turn, then reaction was conducted at room temperature for 18 hours, and washing and drying were conducted to obtain the magnetic carboxylated cellulose nanofibers with the carboxylated cellulose nanofibers coating $Fe_3O_4$.

3) Preparation of an adsorption layer: 10 g of hexadecylamine was dissolved in 50 mL of ethanol, 6 g of magnetic carboxylated cellulose nanofibers were dispersed in 50 mL of water, the two were mixed, after 35 minutes of ultrasonication, 250 mg of 1-[3-(Dimethylamino)propyl]-3-ethylcarbodiimide hydrochloride and 250 mg of N-hydroxysuccinimide were added into the mixture in turn, then reaction was conducted at room temperature for 24 hours, after reaction, washing was conducted with ethanol water with a volume fraction of 70%, and freeze drying was conducted to prepare the adsorption layer with magnetic responsiveness and a superhydrophobic-superlipophilic performance.

S3. Preparation of an intelligent response layer:

(1) Preparation of hyperbranched polycarboxylic acid: 0.1 mol of trimethylolpropane (13.4 g), 0.4 mol of citric acid (76.8 g) and p-toluenesulfonic acid (1.35 g) were placed in a 250 mL 3-neck flask first; and then the 3-neck flask was placed in an oil bath and was connected with a the mechanical stirring device. The middle port was inserted with a stirrer with a rotation speed of 250 r/min, the left port was plugged with a rubber plug, the right port was connected to a condensation bend, and the top of the flask was covered with a rag to make it easier for water vapor to flow out of the bend during the reaction. The oil bath was set to 150° C., and reaction time was 2.5 hours. At the end of the reaction, the product hyperbranched polycarboxylic acid was quickly poured from the side port with less water vapor into a small beaker, and the beaker was sealed with plastic wrap, cooled at room temperature, and finally was stored in a dryer.

(2) Polyethyleneimine and hyperbranched polycarboxylic acid were dissolved in 2 wt % sodium hydroxide aqueous solution at a mass ratio of 1:0.6, then sodium hypophosphite was added to the mixture at a mass ratio of the polyethyleneimine to sodium hypophosphite of 1:1.2, then after the reaction was finished by stirring at 105° C., the mixture was cooled to room temperature to obtain the hyperbranched polycarboxylic acid-modified polyethyleneimine; and a mass ratio of the polyethyleneimine to the hyperbranched polycarboxylic acid was regulated to 1:0.6, so that the molar ratio of the amino groups to the carboxyl groups on the hyperbranched polycarboxylic acid-modified polyethyleneimine correspondingly obtained was 1:0.5.

(3) After the carboxylated cellulose nanofibers prepared in the step S1 and the hyperbranched polycarboxylic acid-modified polyethyleneimine were mixed well at a mass ratio of 1:20, N-(3-dimethylaminopropyl)-N'-ethylcarbodiimide hydrochloride (mass ratio of carboxylated cellulose nanofibers to N-(3-dimethylaminopropyl)-N'-ethylcarbodiimide hydrochloride was 1:0.5) and N-hydroxysuccinimide (mass ratio of carboxylated cellulose nanofibers to N-hydroxysuccinimide was 1:0.5) were added into the mixture in turn, then reaction was continued for 24 hours at room temperature, then 0.1 mol/L HCl solution was used to rinse, finally centrifugation was conducted at a speed of 10000 r/min to neutral, and freeze drying was conducted to obtain the intelligent response layer.

S4. Preparation of a fast and high-capacity intelligent cellulose-based oil-absorbing material:

The intelligent response layer and the adsorption layer formed a double-layer structure by layer by layer vacuum filtration: the adsorption layer was suction filtered, then the intelligent response layer was suction filtered to form the double-layer structure, a mass ratio of the adsorption layer to the intelligent response layer was 50:1; after the double-layer structure was formed, a vacuum degree during suction filtration was controlled to 0.04 MPa, a cross-linking agent epichlorohydrin (a mass of the added epichlorohydrin is 10% of a total mass of the adsorption layer and the intelligent response layer) was sprayed on a surface of the double-layer structure by a spray way, the cross-linking agent was penetrated inside the material relying on low vacuum, soaking was conducted in water at room temperature for 2.0 hour, and then freeze drying was conducted to form an aerogel to obtain the fast and high-capacity intelligent cellulose-based oil-absorbing material.

Embodiment 4

The differences from Embodiment 1 were that in the step S3 (2), the polyethyleneimine and the hyperbranched polycarboxylic acid were dissolved in 2 wt % sodium hydroxide aqueous solution at a mass ratio of 1:1.6, and then sodium hypophosphite was added into the mixture with a mass ratio of the polyethyleneimine to sodium hypophosphite of 1:0.8, then after a reaction of stirring at 100° C. was completed, the mixture was cooled to room temperature to obtain the hyperbranched polycarboxylic acid-modified polyethyleneimine; the mass ratio of the polyethyleneimine to the hyperbranched polycarboxylic acid was regulated to 1:1.6, so that the molar ratio of the amino groups to the carboxyl groups on the hyperbranched polycarboxylic acid-modified polyethyleneimine correspondingly obtained was 1:1.5; and other steps and methods are the same as Embodiment 1.

Embodiment 5

The differences from Embodiment 1 were that in the step S3 (2), the polyethyleneimine and the hyperbranched polycarboxylic acid were dissolved in 2 wt % sodium hydroxide aqueous solution at a mass ratio of 1:1.9, and then sodium hypophosphite was added into the mixture with a mass ratio of the polyethyleneimine to sodium hypophosphite of 1:0.8, then after a reaction of stirring at 100° C. was completed, the mixture was cooled to room temperature to obtain the hyperbranched polycarboxylic acid-modified polyethyleneimine; the mass ratio of the polyethyleneimine to the hyperbranched polycarboxylic acid was regulated to 1:1.9, so that the molar ratio of the amino groups to the carboxyl groups on the hyperbranched polycarboxylic acid-modified polyethyleneimine correspondingly obtained was 1:1.75; and other steps and methods are the same as Embodiment 1.

Embodiment 6

The differences from Embodiment 1 were that in the step S3 (2), the polyethyleneimine and the hyperbranched polycarboxylic acid were dissolved in 2 wt % sodium hydroxide aqueous solution at a mass ratio of 1:2.2, and then sodium hypophosphite was added into the mixture with a mass ratio of the polyethyleneimine to sodium hypophosphite of 1:0.8, then after a reaction of stirring at 100° C. was completed, the mixture was cooled to room temperature to obtain the hyperbranched polycarboxylic acid-modified polyethyleneimine; the mass ratio of the polyethyleneimine to the hyperbranched polycarboxylic acid was regulated to 1:2.2, so that the molar ratio of the amino groups to the carboxyl groups on the hyperbranched polycarboxylic acid-modified polyethyleneimine correspondingly obtained was 1:2.0; and other steps and methods are the same as Embodiment 1.

Performance Test of the Fast and High-Capacity Intelligent Cellulose-Based Oil-Absorbing Materials Prepared in Embodiments 1-6:

1. Test of Oil Absorption Rate and Regeneration Rate of the Materials Prepared in Embodiments 1-6:

Oil product was put into a dry beaker, the sample was put into the beaker containing the oil products, after 2 minutes' standing and adsorption under normal temperature conditions, the material was taken out for standing and draining, and weighed, and the test was repeated three times for the average.

Calculation Formula of Oil Absorption Rate:

$$Q=(m_2-m_1)/m_1$$

Where: Q denotes the oil absorption rate (g/g); $m_1$ denotes the mass (g) of dry oil-absorbing material; and $m_2$ denotes the mass (g) of oil-absorbing material after oil absorption.

Calculation Formula of Regeneration Rate:

$R = Q'/Q$

Where: R denotes the regeneration rate (%); Q denotes the oil absorption rate (g/g) of the first oil absorption; and Q' denotes the oil absorption rate (g/g) of the Nth oil absorption.

The oil absorption rates of the materials prepared in Embodiments 1-6 in various oil products are shown in Table 1 below:

| Item | crude oil oil absorption rate (2 min) | diesel oil absorption rate (2 min) | gasoline oil absorption rate (2 min) | engine oil oil absorption rate (2 min) | peanut oil oil absorption rate (2 min) |
|---|---|---|---|---|---|
| Embodiment 1 | 121 g/g | 113 g/g | 117 g/g | 124 g/g | 119 g/g |
| Embodiment 2 | 120 g/g | 113 g/g | 119 g/g | 125 g/g | 120 g/g |
| Embodiment 3 | 123 g/g | 115 g/g | 117 g/g | 123 g/g | 119 g/g |
| Embodiment 4 | 122 g/g | 114 g/g | 118 g/g | 127 g/g | 118 g/g |
| Embodiment 5 | 121 g/g | 117 g/g | 116 g/g | 124 g/g | 120 g/g |
| Embodiment 6 | 123 g/g | 116 g/g | 117 g/g | 125 g/g | 119 g/g |

It can be concluded from the data in Table 1 that the adsorption layers of the materials prepared by the present disclosure are a chemically grafted hydrophobic lipophilic reagent (hexadecylamine), and the grafting rate of the reagent on the fiber is higher than 115%, realizing the superhydrophobic-superlipophilic performance of the absorption layer, with a water contact angle >150° and an oil contact angle <10°, so the materials have very high adsorption capacity and fast adsorptivity for the variety of oil products, and their adsorption capacities are greater than 112 g/g within 2 minutes.

After oil absorption, it is regenerated by mechanical compression, and after repeated 10 times, the oil absorption rate is shown in Table 2 below:

2. Test of Contact Angle of the Intelligent Response Layer Prepared in Embodiments 1-6:

The intelligent response layers prepared in Embodiments 1-6 were soaked in treatment solutions of different pH for 30 minutes, respectively, and after taking out, they were dried at 60° C. for 12 hours to obtain samples treated with treatment solutions of different pH.

| Sample | Treatment for sample |
|---|---|
| Sample 1 | The intelligent response layer prepared in Embodiment 1 was treated with HCl aqueous solution with pH <7 |
| Sample 2 | The intelligent response layer prepared in Embodiment 1 was treated with NaOH aqueous solution with pH >7 |
| Sample 3 | The intelligent response layer prepared in Embodiment 2 was treated with HCl aqueous solution with pH <7 |
| Sample 4 | The intelligent response layer prepared in Embodiment 2 was treated with NaOH aqueous solution with pH >7 |
| Sample 5 | The intelligent response layer prepared in Embodiment 3 was treated with HCl aqueous solution with pH <7 |
| Sample 6 | The intelligent response layer prepared in Embodiment 3 was treated with NaOH aqueous solution with pH >7 |
| Sample 7 | The intelligent response layer prepared in Embodiment 4 was treated with HCl aqueous solution with pH <7 |

| Item | crude oil oil absorption rate (2 min) | crude oil regeneration rate | diesel oil absorption rate (2 min) | diesel regeneration rate | gasoline oil absorption rate (2 min) | gasoline regeneration rate | engine oil oil absorption rate (2 min) | engine oil regeneration rate | peanut oil oil absorption rate (2 min) | peanut oil regeneration rate |
|---|---|---|---|---|---|---|---|---|---|---|
| Embodiment 1 | 114 g/g | 94.2% | 105 g/g | 92.9% | 109 g/g | 93.2% | 117 g/g | 94.4% | 111 g/g | 93.3% |
| Embodiment 2 | 111 g/g | 92.5% | 103 g/g | 91.2% | 110 g/g | 92.4% | 116 g/g | 92.8% | 110 g/g | 91.7% |
| Embodiment 3 | 115 g/g | 93.5% | 106 g/g | 92.2% | 109 g/g | 93.2% | 115 g/g | 93.5% | 111 g/g | 93.3% |
| Embodiment 4 | 115 g/g | 94.3% | 106 g/g | 93.0% | 109 g/g | 92.4% | 120 g/g | 94.5% | 110 g/g | 93.2% |
| Embodiment 5 | 113 g/g | 93.4% | 108 g/g | 92.3% | 107 g/g | 92.2% | 116 g/g | 93.5% | 112 g/g | 94.2% |
| Embodiment 6 | 114 g/g | 92.7% | 107 g/g | 92.2% | 108 g/g | 92.3% | 116 g/g | 92.8% | 111 g/g | 93.3% |

It can be concluded from the data in Table 2 that the materials of the present disclosure can be regenerated by compression after adsorption, and after being regenerated by mechanical compression, after repeated 10 times, their regeneration rates are higher than 90%, and they can still maintain a good adsorption effect.

| Sample | Treatment for sample |
| --- | --- |
| Sample 8 | The intelligent response layer prepared in Embodiment 4 was treated with NaOH aqueous solution with pH >7 |
| Sample 9 | The intelligent response layer prepared in Embodiment 5 was treated with HCl aqueous solution with pH <7 |
| Sample 10 | The intelligent response layer prepared in Embodiment 5 was treated with NaOH aqueous solution with pH >7 |
| Sample 11 | The intelligent response layer prepared in Embodiment 6 was treated with HCl aqueous solution with pH <7 |
| Sample 12 | The intelligent response layer prepared in Embodiment 6 was treated with NaOH aqueous solution with pH >7 |

The contact angle test results of the above samples 1-12 are shown in Table 3 below:

| Sample | Water contact angle | Oil contact angle |
| --- | --- | --- |
| Sample 1 | 8° | 157° |
| Sample 2 | 156° | 8° |
| Sample 3 | 8° | 158° |
| Sample 4 | 159° | 8° |
| Sample 5 | 6° | 158° |
| Sample 6 | 159° | 6° |
| Sample 7 | 157° | 7° |
| Sample 8 | 7° | 157° |
| Sample 9 | 165° | 6° |
| Sample 10 | 6° | 163° |
| Sample 11 | 162° | 8° |
| Sample 12 | 8° | 162° |

The test results show that the intelligent response layers of the materials show good pH response performance, and their intelligent response layers have the intelligent response performance of superhydrophilic-superoleophobic (water contact angle <10°, oil contact angle >150°) and superhydrophobic-superlipophilic (water contact angle >150°, oil contact angle <10°) to pH. By cleverly conceiving and designing the combination of two groups with opposite pH response properties (amino group and carboxyl group), and thereby designing the required response performance according to application requirements, surface properties of the intelligent response layer can switch between superhydrophilic-superoleophobic and superhydrophobic-superlipophilic. That is, it can realize superhydrophilic-superoleophobic under acidic conditions and superhydrophobic-superlipophilic under alkaline conditions, and can also realize superhydrophobic-superlipophilic under acidic conditions and superhydrophilic-superoleophobic under alkaline conditions. It provides convenience for the application of materials in the field of emulsified oil separation.

3. Adsorption Effect Test of the Materials Prepared in Embodiments 1-6 on Emulsified Oil:

The materials prepared in Embodiments 1-6 were soaked in treatment solutions of different pH for 30 minutes, respectively, and after taking out, they were dried at 60° C. for 12 hours to obtain samples treated with treatment solutions of different pH. The emulsified oil was put into a dry beaker, the sample was put into the beaker containing the emulsified oil, after 2 minutes' standing and adsorption under normal temperature conditions, the material was taken out for standing and draining, and weighed, and the oil absorption rate thereof was calculated.

| Sample | Treatment for sample |
| --- | --- |
| Sample 1' | The material prepared in Embodiment 1 was treated with HCl aqueous solution with pH <7 |
| Sample 2' | The material prepared in Embodiment 1 was treated with NaOH aqueous solution with pH >7 |
| Sample 3' | The material prepared in Embodiment 2 was treated with HCl aqueous solution with pH<7 |
| Sample 4' | The material prepared in Embodiment 2 was treated with NaOH aqueous solution with pH >7 |
| Sample 5' | The material prepared in Embodiment 3 was treated with HCl aqueous solution with pH <7 |
| Sample 6' | The material prepared in Embodiment 3 was treated with NaOH aqueous solution with pH >7 |
| Sample 7' | The material prepared in Embodiment 4 was treated with HCl aqueous solution with pH <7 |
| Sample 8' | The material prepared in Embodiment 4 was treated with NaOH aqueous solution with pH >7 |
| Sample 9' | The material prepared in Embodiment 5 was treated with HCl aqueous solution with pH <7 |
| Sample 10' | The material prepared in Embodiment 5 was treated with NaOH aqueous solution with pH >7 |
| Sample 11' | The material prepared in Embodiment 6 was treated with HCl aqueous solution with pH <7 |
| Sample 12' | The material prepared in Embodiment 6 was treated with NaOH aqueous solution with pH >7 |

The oil absorption rates of the above samples 1', 3', 5', 8', 10', 12' in the oil-in-water emulsified diesel are shown in Table 4 below:

| Item | Oil-in-water emulsified diesel (containing 90 wt % water) oil absorption rate (2 min) |
| --- | --- |
| Sample 1' | 112 g/g |
| Sample 3' | 112 g/g |
| Sample 5' | 114 g/g |
| Sample 8' | 113 g/g |
| Sample 10' | 113 g/g |
| Sample 12' | 112 g/g |

The oil absorption rates of the above samples 2', 4', 6', 7', 9', 11' in the water-in-oil emulsified diesel are shown in Table 5 below:

| Item | Water-in-oil emulsified diesel (containing 5 wt % water) oil absorption rate (2 min) |
| --- | --- |
| Sample 2' | 112 g/g |
| Sample 4' | 113 g/g |
| Sample 6' | 113 g/g |
| Sample 7' | 112 g/g |
| Sample 9' | 115 g/g |
| Sample 11' | 114 g/g |

The test results show that the materials show good pH response performance, and their intelligent response layers have the intelligent response performance of superhydrophilic-superoleophobic (water contact angle <10°, oil contact angle >150°) and superhydrophobic-superlipophilic (water contact angle >150°, oil contact angle <10°) to pH. For demulsification of the emulsified oil, the superhydrophilic-superoleophobic property of the material realizes the demulsification of the oil-in-water O/W type emulsified oil, the superhydrophilic-superoleophobic property realizes the demulsification of the water-in-oil W/O type emulsified oil. After emulsified oil is demulsified, the oil can be adsorbed, and the adsorption capacity can be greater than 112 g/g within 2 minutes.

What is claimed is:

1. An intelligent cellulose-based oil-absorbing material, wherein the material comprises an intelligent response layer and an adsorption layer; the intelligent response layer is a pH-responsive nanofiber layer with an adjustable pH response performance, wherein the material is prepared by a method comprising the following steps:

S1, preparation of carboxylated cellulose nanofibers: selectively oxidizing hydroxyl groups on C2 and C3 of a cellulose structural unit of a paper pulp to aldehyde groups using sodium periodate to prepare dialdehyde cellulose; then oxidizing the aldehyde groups on C2 and C3 and hydroxyl groups on C6 of the cellulose structural unit of the dialdehyde cellulose to carboxyl groups using a TEMPO reagent to prepare the carboxylated cellulose nanofibers;

S2, preparation of the adsorption layer:
1) preparation of a modified magnetic fluid $Fe_3O_4$: making $FeCl_3 \cdot 6H_2O$ and $FeSO_4 \cdot 7H_2O$ undergo a chemical co-precipitation reaction under alkaline conditions to obtain $Fe_3O_4$ particles, and then using triethylenetetramine as a complexing agent to modify the $Fe_3O_4$ particles to obtain the modified magnetic fluid $Fe_3O_4$;
2) preparation of magnetic carboxylated cellulose nanofibers by coating ferroferric oxide onto the carboxylated cellulose nanofibers: dispersing the carboxylated cellulose nanofibers prepared in the step S1 in water to prepare a carboxylated cellulose nanofiber dispersion, after adding the modified magnetic fluid $Fe_3O_4$ and mixing, adding 1-[3-(Dimethylamino)propyl]-3-ethylcarbodiimide hydrochloride and N-hydroxysuccinimide into the mixture in turn, then reacting at room temperature for 12 to 18 hours, washing and drying to obtain the magnetic carboxylated cellulose nanofibers comprising $Fe_3O_4$ coated carboxylated cellulose nanofibers; a mass fraction of the carboxylated cellulose nanofiber dispersion is 2% to 5%, a volume/mass/mass/mass ratio of the carboxylated cellulose nanofiber dispersion, the modified magnetic fluid $Fe_3O_4$, 1-[3-(Dimethylamino)propyl]-3-ethylcarbodiimide hydrochloride and N-hydroxysuccinimide is 150 mL:(0.5-1.0 g):500 mg:500 mg;
3) preparation of the adsorption layer by modifying the magnetic carboxylated cellulose nanofibers with hexadecylamine: dissolving the hexadecylamine in ethanol, dispersing the magnetic carboxylated cellulose nanofibers in water, mixing the hexadecylamine in ethanol and the magnetic carboxylated cellulose nanofibers in water into a mixture, after ultrasonicating for 25 to 35 minutes, adding 1-[3-(Dimethylamino)propyl]-3-ethylcarbodiimide hydrochloride and N-hydroxysuccinimide into the mixture in turn, then reacting at room temperature for 6 to 24 hours, washing, and freeze drying to prepare the adsorption layer with magnetic responsiveness and a superhydrophobic-superlipophilic performance; and a mass ratio of hexadecylamine, the magnetic carboxylated cellulose nanofibers, 1-[3-(Dimethylamino)propyl]-3-ethylcarbodiimide hydrochloride and N-hydroxysuccinimide is (5-10):(3-6):0.25:0.25;

S3, preparation of the intelligent response layer:
(1) preparation of a hyperbranched polycarboxylic acid by melting and polycondensing: using trimethylolpropane as a core, citric acid as a reactive monomer, and p-toluenesulfonic acid as a catalyst; mixing the trimethylolpropane, the citric acid and the p-toluenesulfonic acid and reacting at 135° C. to 150° C. under stirring conditions for 1.5 to 2.5 hours to obtain the hyperbranched polycarboxylic acid;
(2) dissolving polyethyleneimine and the hyperbranched polycarboxylic acid in a sodium hydroxide aqueous solution at a mass ratio of 1:(0.2-0.6) or 1:(1.6-2.2), then adding sodium hypophosphite into the mixture at a mass ratio of the polyethyleneimine to sodium hypophosphite of 1:(0.8-1.2), then after a reaction with stirring at 100° C. to 105° C. is completed, cooling the mixture to room temperature to obtain a hyperbranched polycarboxylic acid-modified polyethyleneimine; when regulating a mass ratio of the polyethyleneimine to the hyperbranched polycarboxylic acid to 1:(0.2-0.6), so that a molar ratio of amino groups to carboxyl groups on the hyperbranched polycarboxylic acid-modified polyethyleneimine correspondingly obtained is 1:(0.1-0.5); or when regulating the mass ratio of the polyethyleneimine to the hyperbranched polycarboxylic acid to 1:(1.6-2.2), so that the molar ratio of the amino groups to the carboxyl groups on the hyperbranched polycarboxylic acid-modified polyethyleneimine correspondingly obtained is 1:(1.5-2.0);
(3) after mixing the carboxylated cellulose nanofibers prepared in the step S1 and the hyperbranched polycarboxylic acid-modified polyethyleneimine at a mass ratio of 1:(2-20), adding 1-[3-(dimethylamino)propyl]-3-ethylcarbodiimide hydrochloride and N-hydroxysuccinimide into the mixture in turn, then reacting at room temperature for 8 to 24 hours, then rinsing with an HCl solution, centrifuging, and freeze drying to graft the hyperbranched polycarboxylic acid-modified polyethyleneimine on to the carboxylated cellulose nanofibers and obtain the intelligent response layer; and a mass ratio of the carboxylated cellulose nanofibers, 1-[3-(dimethylamino)propyl]-3-ethylcarbodiimide hydrochloride and N-hydroxysuccinimide is 1:(0.25-0.5):(0.25-0.5); and S4, preparation of the intelligent cellulose-based oil-absorbing material:

suction filtering the adsorption layer, then suction filtering the intelligent response layer to form a double-layer structure, a mass ratio of the adsorption layer to the intelligent response layer being (10-50):1; after forming the double-layer structure, controlling a vacuum degree during suction filtration to 0.01 to 0.04 MPa, spraying the cross-linking agent epichlorohydrin on a surface of the double-layer structure, relying on vacuum to penetrate the cross-linking agent inside the material double-layer structure, soaking in water at room temperature for 0.5 to 2.0 hours, and then freeze-drying to form an aerogel to obtain the intelligent cellulose-based oil-absorbing material; a mass of the added epichlorohydrin is 1% to 10% of a total mass of the adsorption layer and the intelligent response layer.

2. The intelligent cellulose-based oil-absorbing material according to claim 1, wherein a specific operation of the preparation of the modified magnetic fluid $Fe_3O_4$ in the step 1) is as follows: adding deionized water into a mixture of $FeCl_3 \cdot 6H_2O$ and $FeSO_4 \cdot 7H_2O$, stirring in a 70° C. to 80° C. water bath until dissolved, after bubbling nitrogen for 5 to 15 minutes, quickly adding an ammonia water with a mass fraction of 30% to 35%, continuing stirring under nitrogen protection for 1 to 3 hours to obtain the $Fe_3O_4$ particles; adding the $Fe_3O_4$ particles into a triethylenetetramine aqueous solution with a mass fraction of 2% to 5%, stirring for 0.5 to 1.0 hours, heating to 90° C. to 95° C., curing with heat preservation for 20 to 30 minutes to obtain the modified magnetic fluid $Fe_3O_4$; and a mass/mass/volume/volume ratio of $FeCl_3.6H_2O$, $FeSO_4.7H_2O$, deionized water, the ammonia water with the mass fraction of 30% to 35% and the triethylenetetramine aqueous solution with the mass fraction of 2% to 5% is 18 g:(9-10 g):20 mL:30 mL:30 mL.

3. The intelligent cellulose-based oil-absorbing material according to claim 1, wherein the paper pulp is one of or a mixture of two or more of a bleached bagasse pulp fiber, a bleached eucalyptus pulp fiber, a bleached bamboo pulp fiber, a bleached masson pine pulp fiber, and a bleached wheat straw pulp fiber.

4. The intelligent cellulose-based oil-absorbing material according to claim 1, wherein the intelligent response layer has an intelligent response performance of superhydrophilic-superoleophobic or superhydrophobic-superlipophilic to pH; the intelligent response layer has a water contact angle <10° and an oil contact angle >150° when having superhydrophilic-superoleophobic property to pH, and has a water contact angle >150° and an oil contact angle <10° when having superhydrophobic-superlipophilic property to pH; regulating the molar ratio of the amino groups to the carboxyl groups on the hyperbranched polycarboxylic acid-modified polyethyleneimine to 1:(0.1-0.5) or 1:(1.5-2.0) to regulate a molar ratio of amino groups to carboxyl groups on a fiber of the intelligent response layer to 1:(0.1-0.5) or 1:(1.5-2.0), when the molar ratio of the amino groups to the carboxyl groups is 1:(0.1-0.5) and pH of the intelligent response layer is acidic, the intelligent response layer has superhydrophilic-superoleophobic property, when the pH of the intelligent response layer changes from acidic to alkaline, the intelligent response layer changes from superhydrophilic-superoleophobic property to superhydrophobic-superlipophilic property; when the molar ratio of the amino groups to the carboxyl groups is 1:(1.5-2.0) and the pH of the intelligent response layer is acidic, the intelligent response layer has superhydrophobic-superlipophilic property, when the pH of the intelligent response layer changes from acidic to alkaline, the intelligent response layer changes from superhydrophobic-superlipophilic property to superhydrophilic-superoleophobic property; the adsorption layer has superhydrophobic-superlipophilic performance, with a water contact angle >150° and an oil contact angle <10°.

5. The intelligent cellulose-based oil-absorbing material according to claim 2, wherein the intelligent response layer has an intelligent response performance of superhydrophilic-superoleophobic or superhydrophobic-superlipophilic to pH; the intelligent response layer has a water contact angle <10° and an oil contact angle >150° when having superhydrophilic-superoleophobic property to pH, and has a water contact angle >150° and an oil contact angle <10° when having superhydrophobic-superlipophilic property to pH; regulating the molar ratio of the amino groups to the carboxyl groups on the hyperbranched polycarboxylic acid-modified polyethyleneimine to 1:(0.1-0.5) or 1:(1.5-2.0) to regulate a molar ratio of amino groups to carboxyl groups on a fiber of the intelligent response layer to 1:(0.1-0.5) or 1:(1.5-2.0), when the molar ratio of the amino groups to the carboxyl groups is 1:(0.1-0.5) and pH of the intelligent response layer is acidic, the intelligent response layer has superhydrophilic-superoleophobic property, when the pH of the intelligent response layer changes from acidic to alkaline, the intelligent response layer changes from superhydrophilic-superoleophobic property to superhydrophobic-superlipophilic property; when the molar ratio of the amino groups to the carboxyl groups is 1:(1.5-2.0) and the pH of the intelligent response layer is acidic, the intelligent response layer has superhydrophobic-superlipophilic property, when the pH of the intelligent response layer changes from acidic to alkaline, the intelligent response layer changes from superhydrophobic-superlipophilic property to superhydrophilic-superoleophobic property; the adsorption layer has superhydrophobic-superlipophilic performance, with a water contact angle >150° and an oil contact angle <10°.

6. The intelligent cellulose-based oil-absorbing material according to claim 3, wherein the intelligent response layer has an intelligent response performance of superhydrophilic-superoleophobic or superhydrophobic-superlipophilic to pH; the intelligent response layer has a water contact angle <10° and an oil contact angle >150° when having superhydrophilic-superoleophobic property to pH, and has a water contact angle >150° and an oil contact angle <10° when having superhydrophobic-superlipophilic property to pH; regulating the molar ratio of the amino groups to the carboxyl groups on the hyperbranched polycarboxylic acid-modified polyethyleneimine to 1:(0.1-0.5) or 1:(1.5-2.0) to regulate a molar ratio of amino groups to carboxyl groups on a fiber of the intelligent response layer to 1:(0.1-0.5) or 1:(1.5-2.0), when the molar ratio of the amino groups to the carboxyl groups is 1:(0.1-0.5) and pH of the intelligent response layer is acidic, the intelligent response layer has superhydrophilic-superoleophobic property, when the pH of the intelligent response layer changes from acidic to alkaline, the intelligent response layer changes from superhydrophilic-superoleophobic property to superhydrophobic-superlipophilic property; when the molar ratio of the amino groups to the carboxyl groups is 1:(1.5-2.0) and the pH of the intelligent response layer is acidic, the intelligent response layer has superhydrophobic-superlipophilic property, when the pH of the intelligent response layer changes from acidic to alkaline, the intelligent response layer changes from superhydrophobic-superlipophilic property to superhydrophilic-superoleophobic property; the adsorption layer has superhydrophobic-superlipophilic performance, with a water contact angle >150° and an oil contact angle <10°.

* * * * *